United States Patent
Chen et al.

(10) Patent No.: US 6,788,650 B2
(45) Date of Patent: Sep. 7, 2004

(54) NETWORK ARCHITECTURE, ADDRESSING AND ROUTING

(75) Inventors: Priscilla Chen, Sunrise, FL (US); Vernon A. Allen, Fort Lauderdale, FL (US); Oleg Andric, West Palm Beach, FL (US); Lance E. Hester, Davie, FL (US); Yan Huang, Weston, FL (US)

(73) Assignee: Motorola, Inc., Schaumburg, IL (US)

( * ) Notice: Subject to any disclaimer, the term of this patent is extended or adjusted under 35 U.S.C. 154(b) by 120 days.

(21) Appl. No.: 10/304,428

(22) Filed: Nov. 26, 2002

(65) Prior Publication Data

US 2003/0227931 A1 Dec. 11, 2003

Related U.S. Application Data

(60) Provisional application No. 60/386,511, filed on Jun. 6, 2002.

(51) Int. Cl.[7] .......................... H04L 12/28; H04L 12/56; H04Q 7/24
(52) U.S. Cl. .......................... 370/254; 370/338; 370/408
(58) Field of Search .................................. 370/254, 256, 370/395.54, 328, 338, 400, 408, 409

(56) References Cited

U.S. PATENT DOCUMENTS

| 5,517,494 | A | * | 5/1996 | Green | 370/408 |
| 5,850,592 | A | * | 12/1998 | Ramanathan | 455/7 |
| 6,349,091 | B1 | * | 2/2002 | Li | 370/238 |
| 6,456,599 | B1 | * | 9/2002 | Elliott | 370/254 |
| 2002/0089962 | A1 | * | 7/2002 | Lagoutte | 370/338 |
| 2003/0235175 | A1 | * | 12/2003 | Naghian et al. | 370/338 |
| 2004/0017783 | A1 | * | 1/2004 | Szentesi et al. | 370/256 |
| 2004/0057411 | A1 | * | 3/2004 | Straub et al. | 370/338 |

* cited by examiner

Primary Examiner—Hassan Kizou
Assistant Examiner—Timothy Lee
(74) Attorney, Agent, or Firm—Kenneth A. Haas

(57) ABSTRACT

The invention provides methods (300) for organizing and assigning network address to network nodes in clusters (108, 110, 112, 114, 116, 118, 120, 212, 214, 216, 218, 220), and forming new clusters and also provides a method 700 for routing messages in clusters. According to the invention, clusters are organized into hierarchical tree arrangements, with addresses assigned in a manner that facilitates routing messages.

18 Claims, 6 Drawing Sheets

|  | L0 | L1 | L2 | L3 | L4 | L5 | L6 | L7.... |
|---|---|---|---|---|---|---|---|---|
| Cm = 2 | 126 | 62 | 30 | 14 | 6 | 2 | <1 | N/A |
| Cm = 3 | 84 | 27 | 8 | 2 | <1 | N/A | N/A | N/A |
| Cm = 4 | 63 | 15 | 3 | <1 | N/A | N/A | N/A | N/A |
| Cm = 5 | 50 | 9 | 1 | N/A | N/A | N/A | N/A | N/A |
| Cm = 6 | 42 | 6 | <1 | N/A | N/A | N/A | N/A | N/A |
| Cm = 7 | 36 | 5 | <1 | N/A | N/A | N/A | N/A | N/A |
| Cm = 8 | 31 | 3 | <1 | N/A | N/A | N/A | N/A | N/A |
| Cm = 9 | 28 | 3 | <1 | N/A | N/A | N/A | N/A | N/A |
| Cm = 10 | 25 | 2 | <1 | N/A | N/A | N/A | N/A | N/A |
| Cm = 11 | 22 | 1 | N/A | N/A | N/A | N/A | N/A | N/A |
| Cm = 12 | 21 | 1 | N/A | N/A | N/A | N/A | N/A | N/A |
| Cm = 13 | 19 | 1 | N/A | N/A | N/A | N/A | N/A | N/A |
| Cm = 14 | 18 | 1 | N/A | N/A | N/A | N/A | N/A | N/A |
| Cm = 15 | 16 | 1 | N/A | N/A | N/A | N/A | N/A | N/A |
| Cm = 16 | 15 | <1 | N/A | N/A | N/A | N/A | N/A | N/A |
| Cm = 17 | 14 | <1 | N/A | N/A | N/A | N/A | N/A | N/A |
|  |  |  |  |  |  |  |  |  |
| Cm = 252 | 1 | N/A | N/A | N/A | N/A | N/A | N/A | N/A |

*FIG. 5*

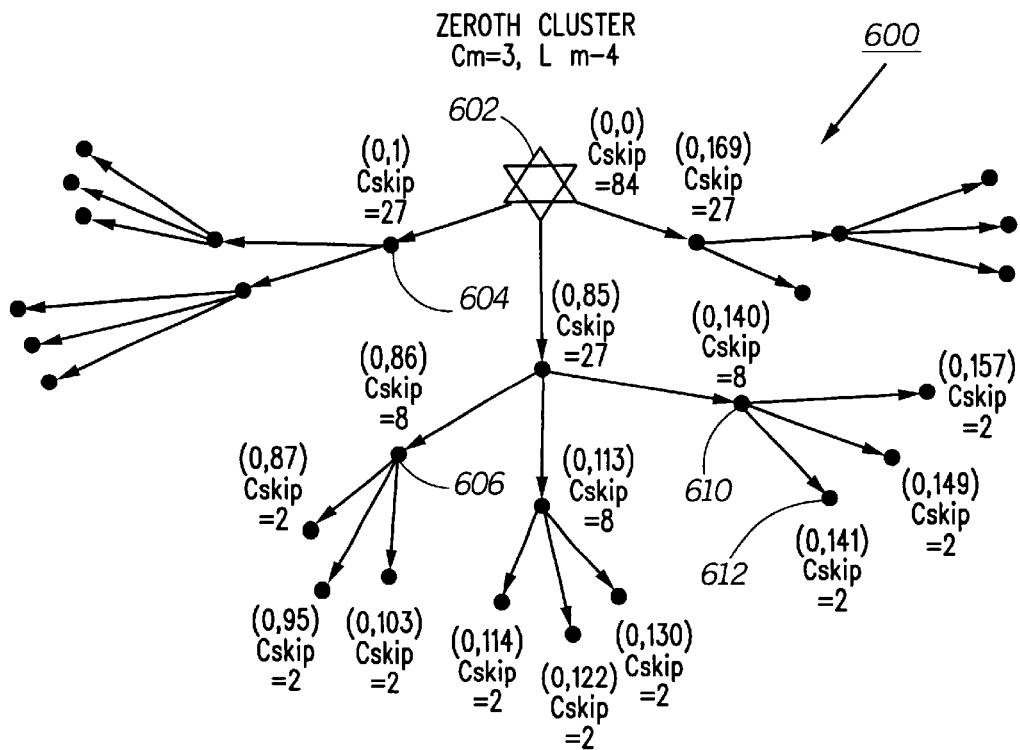

*FIG. 6*

NETWORK ARCHITECTURE, ADDRESSING AND ROUTING

CROSS REFERENCE TO RELATED APPLICATIONS

This application is related to provisional application Serial No. 60/386,511 filed Jun. 6, 2002, entitled "Communication Methodology of Mobile Nodes in a Network by Andric et al., application Ser. No. 10/125,939 filed Apr. 29, 2002, entitled "Communication Network Utilizing a Cluster Tree Protocol"" by M. Meada et al., application Ser. No. 09/803,259, filed Mar. 9 2001, entitled "A Protocol for a Self-Organizing Network Using a Logical Spanning Tree Backbone", by C. C. Lee et al., and application Ser. No. 10/036,553, filed Dec. 21, 2001, now U.S. Pat. No. 6,744,740 entitled, "Network Protocol for Wireless Devices Utilizing Location Information", by P. Chen et al., which are hereby incorporated herein by reference and assigned to Motorola, Inc.

BACKGROUND OF THE INVENTION

1. Field of the Invention

The present invention relates in general to networking. More particularly, the present invention relates to wireless network architecture, addressing and routing.

2. Description off Related Art

Given the reduced cost of manufacturing simple wireless communication device using modern manufacturing technology, and the anticipated further reduction in the cost, there is an interest in providing wireless communication functionality to a variety consumer and industrial devices. Examples of devices that may benefit from wireless communication functionality include wireless sensors, wireless actuators industrial and environmental monitoring devices and control systems, wireless personal computer peripherals, toys, security devices.

In a particular location, it is in certain cases desirable to organize, some or all the devices that are present into a network so that they are able to interoperate. A particular specification for wireless devices intended to interoperate for a variety of applications is IEEE 802.15.4.

BRIEF DESCRIPTION OF THE FIGURES

The present invention will be described by way of exemplary embodiments, but not limitations, illustrated in the accompanying drawings in which like references denote similar elements, and in which:

FIG. 5 is a table giving values that are preferably used in the method shown in FIGS. 3, 4 by which addresses of child nodes are to be spaced according to a layer number, and a permissible number of children for each node, according to the preferred embodiment of the invention;

FIG. 6 is an example of a topology of a cluster developed according to the method shown in FIGS. 3, 4 according to the preferred embodiment of the invention;

DETAILED DESCRIPTION OF THE PREFERRED EMBODIMENTS

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

Figure 1:
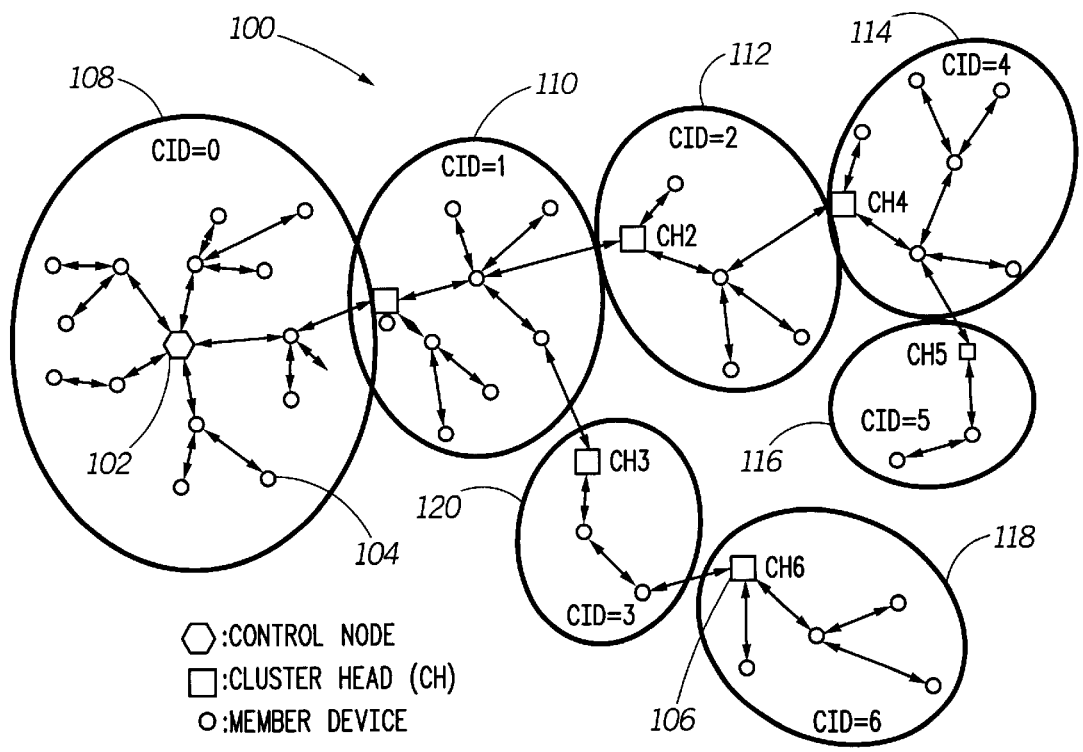
FIG. 1 is a graph of a network of a first type topology according to a preferred embodiment of the invention.

FIG. 1 is a graph of a network 100 of a first type topology according to a preferred embodiment of the invention. The network 100 comprises a plurality of network nodes (e.g., 102, 104, 106) arranged in a plurality of clusters 108, 110, 112, 114, 116, 118, 120 that are demarcated by ellipses. A first cluster 108 includes a central control node 102 for the network 100. The central control node 102 is represent by an octagon in FIG. 1. Each of the remaining cluster 110–120 each include a cluster head node represented by a square. For example cluster 118 includes a cluster head 106. Within each cluster, network nodes are arranged in a hierarchical tree structure in which a cluster head for the respective cluster is located at a root position of the hierarchical tree structure. Double sided arrows represent communication links (or 'hops') between nodes. In communicating from one node to another it may be necessary for messages to traverse multiple hops. Multiple hop communication allows nodes to communicate using lower power shorter range signals, and thus to allows nodes to operate from low power sources such as batteries of photovoltaic devices.

The network nodes in each cluster, are considered to belong to a number of layers. The number of the layer in which each node is located is equal to the number of hops between the particular node and the cluster head of the cluster of the particular node.

The network 100 as a whole also has the form of a larger hierarchical tree structure, with the central control node 102 at the root position of the larger hierarchical tree. Note that in the network 100 cluster heads are separated by multiple hops (edges) from the central control node 102, and that different cluster heads are separated by different numbers of hops from the central control node 102. Network nodes other than the cluster heads and the central control node 102, are represented by circles in FIG. 1.

Preferably, communication between network nodes in different clusters is routed through the cluster heads of the different clusters. Alternatively, if two network nodes that are in different clusters, are nonetheless within range of each other direct communication between the two nodes is an option. Preferably as described below in more detail with reference to FIG. 7 communication within a cluster does necessarily not need to go through the cluster head of the cluster or involve the central control node 102.

In the case that the network is to be communicatively coupled to an external network (not shown) the central control node 102 preferably includes network gateway functionality or is coupled to a network gateway.

The network 100 is preferably a wireless communication network, and the network nodes (e.g., 102, 104, 106) of the network 100 are preferably wireless communication devices. More preferably, the network nodes (e.g., 102, 104, 106) of the network 100 are preferably fixed infrastructure nodes of a wireless communication system such as a wireless LAN or an IEEE 802.15.4 type wireless communication system.

Figure 2:
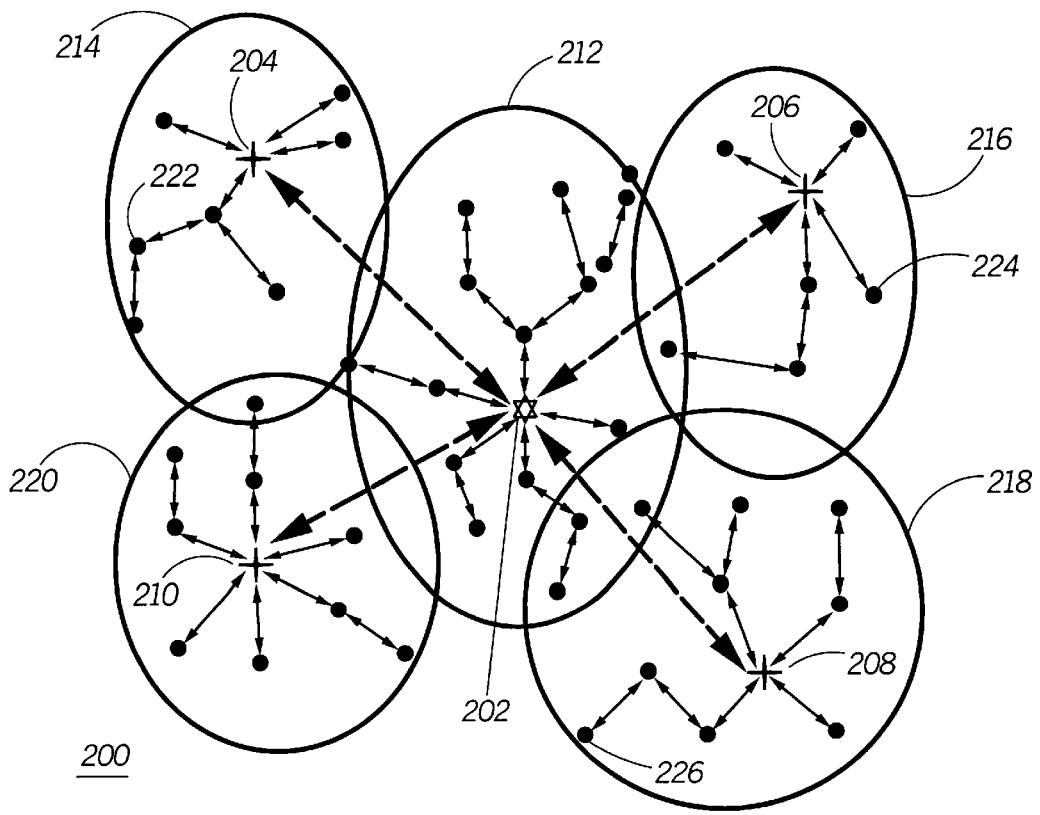
FIG. 2 is a graph of a network of a second type topology according to an alternative embodiment of the invention.

FIG. 2 is a graph of a network 200 of a second type topology according to an alternative embodiment of the invention. The network 200 comprises a central control node 202, and four root nodes 204, 206, 208, 210 that communicate directly via single hop links with the central control node 202. The central control nodes 202, and the four root nodes 204, 206, 208, 210 serve as cluster heads for five clusters 212, 214, 216, 218, 220 into which network nodes of the network 200 are organized. Each of the clusters includes one of the four root nodes 204, 206, 208, 210 or central control node as well as other nodes (e.g., 222, 224, 226). Each of the clusters 212, 214, 216, 218, 220 is arranged in a hierarchical tree topology with a cluster head (e.g., 202, 204, 206, 208, 210) at a root position. The overall network 200 is also arranged in a hierarchical tree topology with the central control node 202 at the root position. Note that in the network shown in FIG. 2 in contrast to the network shown in FIG. 1, the cluster head of each cluster 214, 216, 218, 220, aside from a first cluster 212 which is rooted at the central control node 202, directly communicates with the central control node 202. The topology shown in FIG. 2 is more appropriate where a network is planned in more detail prior to deployment and suitable positions for positioning the root nodes 204, 206, 206, 210 are determined ahead of time. The network 200 is preferably a wireless communication network.

A cluster address (CID) is preferably used within the networks 100, 200 to specify a cluster e.g., 108–120, 212–220 to which, or from which messages are sent. The cluster address is preferably a fixed bit width word, for example an eight bit word which corresponds to a maximum address space of 256 addresses. Certain cluster addresses are preferably set aside for special purposes, for example to signify that a message is to be broadcast, or for use as a temporary address for use prior to assignment of a unique cluster address.

Within each cluster 108–120, 212–220 of the networks 100, 200 a network address (NID) is used to specify a particular node. The network address is also preferably a fixed bit width word, such as an eight bit word. Certain addresses are preferably set aside for special purposes, for example to signify that a message is being broadcast to all nodes, as a temporary address, and to specify that a message is intended for a mobile device that is in communication with at least one node of one of the networks 100, 200.

For the network shown in FIG. 1 network formation preferably starts when the central control node 102 and at least one other node are turned on and are within communication range of each other. More preferably more than two nodes are turned on and at least subsets of the more than two nodes are within range of each other. The first cluster 108 is initially formed around the central control node 102.

For the network shown in FIG. 2 network formation preferably commences when the central control node 202, the root nodes 204, 206, 208, 210, and one or more other nodes are turned on, and the one or more other nodes are within range of at least one of the central control node 202, and the root nodes 204, 206, 208, 210. In the network 200 the number of clusters can be predetermined by the number of root nodes 204, 206, 208, and 210 provided, or alternatively more clusters can be allowed to form as the network 200 grows.

Figure 3:
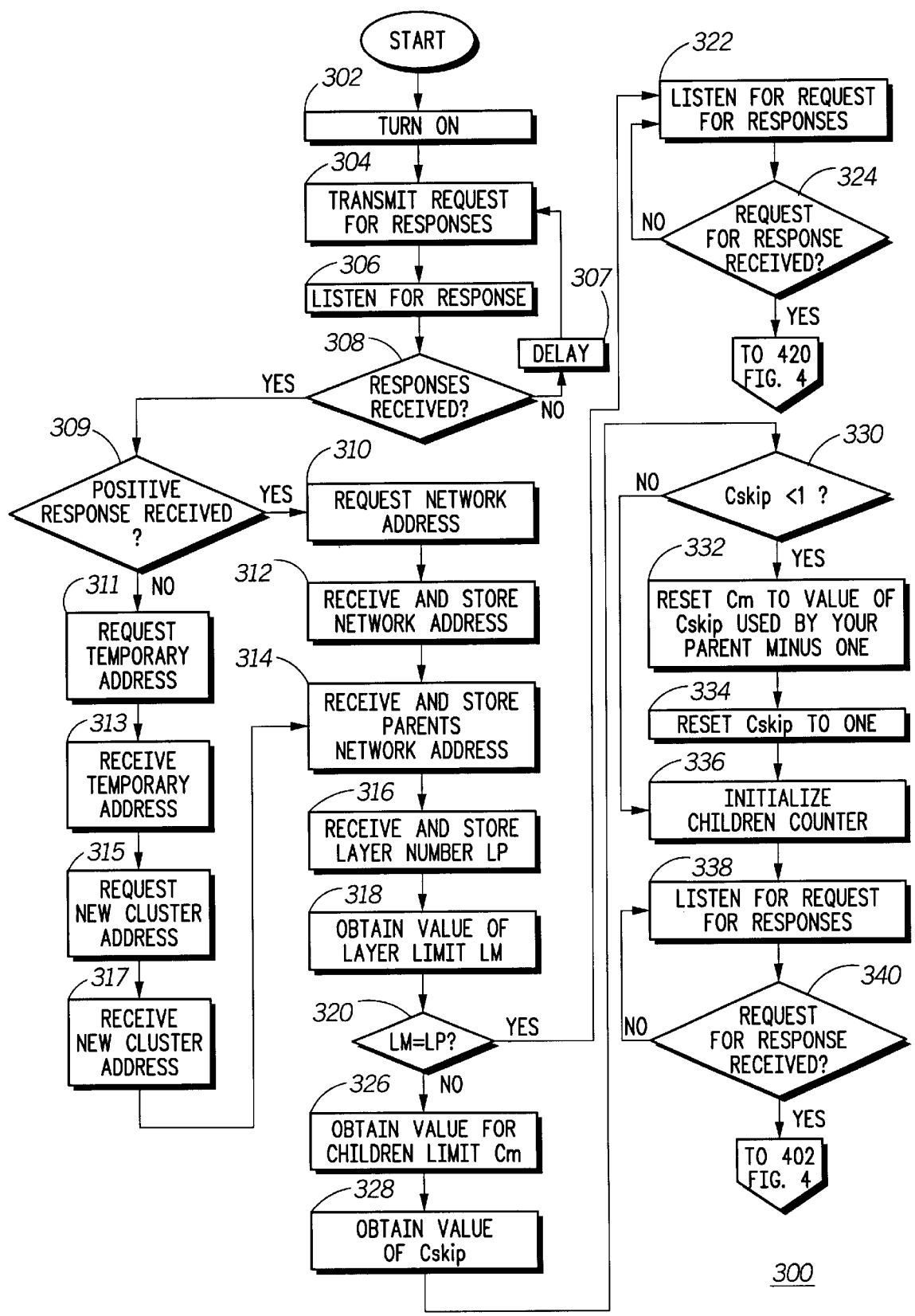
FIG. 3 is a first part of a flow chart of a method for assigning addresses within a cluster such as are shown in FIGS. 1, 2 and establishing new clusters according to the preferred embodiment of the invention.
Figure 4:
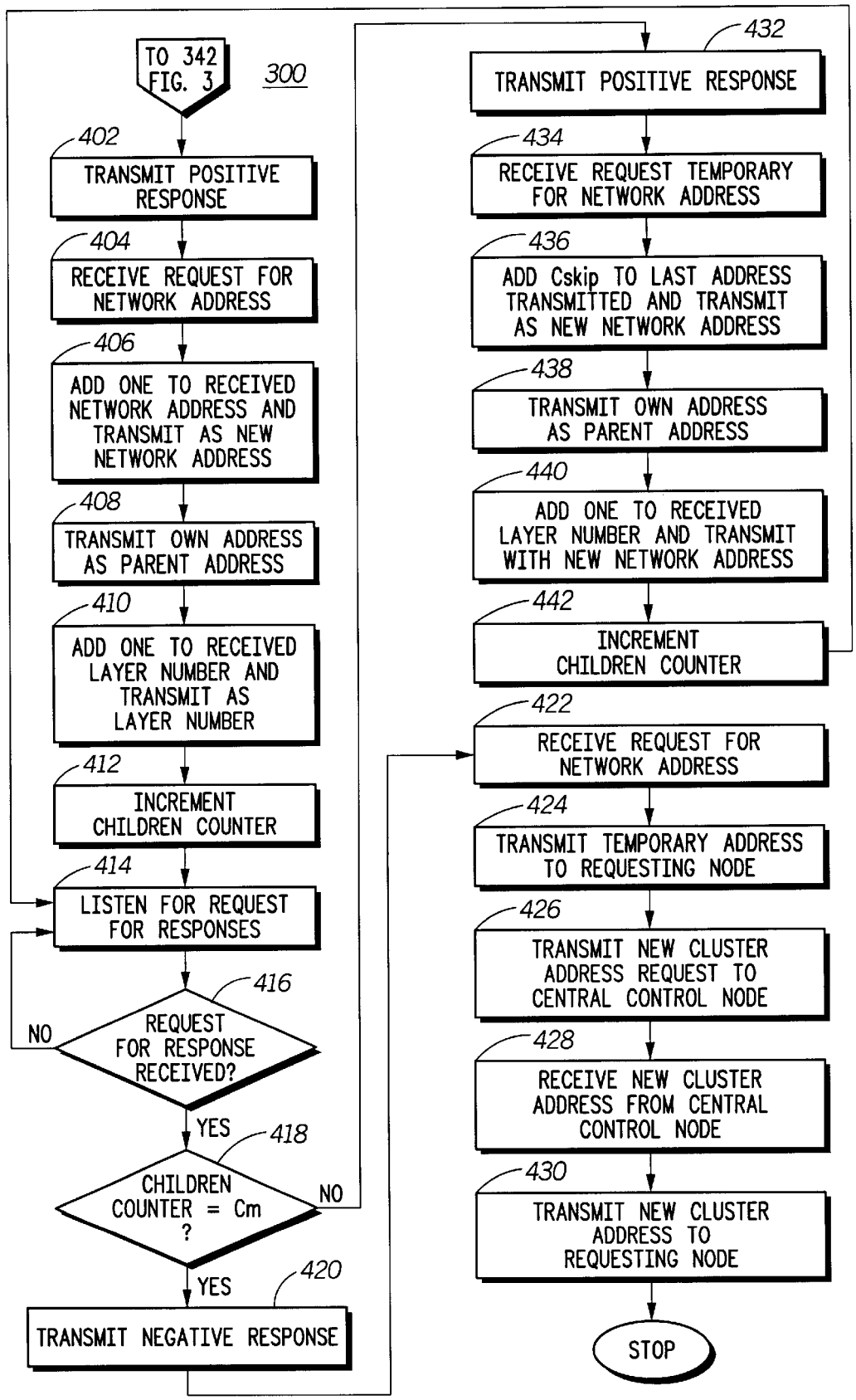
FIG. 4 is a second part of the flow chart begun in FIG. 3.

FIG. 3 is a first part of a flow chart 300 of a method for assigning addresses within a cluster such as are shown in FIGS. 1, 2 and establishing new clusters according to the preferred embodiment of the invention and FIG. 4 is a second part of the flow chart begun in FIG. 3. The flow chart shown in FIGS. 3, 4 shows a method performed by a particular network node, hereinafter referred to as the ith node from the perspective of the ith node. Other network nodes also executing the same method 300 interact to form clusters of the networks shown in FIGS. 1 and 2. In step 302 the ith node turns on. Turn on can be automatic or due to user action. In step 304 the ith node starts to transmit a request for responses. A purpose of transmitting such requests is to ascertain if other nodes are within range of the ith node and are available as parents for the ith node. In step 306 the ith node listens for responses for a predetermined period of time. During the predetermined period the ith node may receive either a negative or a positive response. Step 308 is a decision block the outcome of which depends on whether a response was received. If not the method 300 loops back through a delay 307 to block 304 and again transmits a request for responses. If a response has been received, the method 300 proceeds to decision block 309 the outcome of which depends on whether a positive response was received. A negative response indicates that although a responding node is in range of the ith node it cannot accept the ith node as a child. If in block 309 it is determined that a positive response was received the method 300 continues with step 310 in which the ith node requests a network address from a device that issued the positive response. The node that issued the positive response becomes the parent of the ith node. In step 312 the ith node receives and stores a network address that will be the network address of the ith node from the parent. Thereafter the method 300 continues with step 314.

If on the other hand it is determined in step 309 that a negative response was received, the method continues with step 311 in which the ith node requests a temporary address. Subsequently, in step 313 the ith node receives a temporary address to be used temporarily in communicating. Thereafter, in step 315, the ith node requests a new cluster address, and in step 317 the ith node receives a new cluster head address. Thereafter, the ith node begins to function as a new cluster head with the node from which the ith node received a response in step 306 acting as the parent of the ith node. The network of the ith device within the new cluster will is preferably set to zero. Until the parent has completed communicating with the ith device for the purpose of relaying the new cluster head address, the parent will not issue the temporary address to another node. Subsequently the method continues with step 314.

In step 314 the ith node receives and stores the address of the parent. As described below in more detail with reference to FIG. 7, the ith node uses the parents address for routing messages that originate at the ith node or are routed through the parent node.

In step 316 the ith node receives a layer number LP assignment from the parent. Alternatively, in step 316 the ith node receives the parent's layer number assignment and adds one to this value. (In the case that the ith node has become a new cluster head the layer number is zero.) In step 318 a value of a layer limit LM for the cluster of which the ith node is a part is obtained. The layer limit LM is preferably obtained from the parent node. Alternatively, the layer limit is preprogrammed in the ith node. Block 320 is a decision block the outcome of which depends on weather the layer number LP of the ith node is equal to the layer limit LM. If the layer number LP is equal to the layer number limit LM, then, the ith node need not support any children, nonetheless in the interest of facilitating other nodes joining the network of which the ith node is a part, the method proceeds to step 322 in which the ith node listens for requests for responses. Block 324 is a decision block which tests if a request for response is received. If not the method 300 loops back to step 322 and continues to listen for requests for responses. If a request for responses is received then the method 300 jumps to step 420 (FIG. 4). Step 420 and the subsequent steps are described below in further detail. Briefly, after reaching step 420 other nodes that contact the ith node seeking a parent are directed to start another cluster. The other nodes will also seek another parent in an already established cluster.

If in block 320 it is determined that the layer number LP of the ith node, is not equal to the layer limit LM the method 300 continues with step 326 in which the ith node obtains a value for a limit, denoted Cm, on the number of children that the ith may have. The limit Cm is preferably a constant for the network (e.g., 100, 200) of which the ith node is to be part. Alternatively, the value of Cm varies from layer to layer within each cluster. The value of Cm is preferably received from the parent of the ith node. Alternatively, the value of Cm is stored in a memory of the ith node, or embedded in program code that embodies the method 300.

In step 328 a value by which addresses of children of the ith node are to be spaced, denoted Cskip is obtained. Cskip is integer valued. Cskip also plays a role in routing decisions, as described below in more detail with reference to FIG. 7. The value of Cskip used by the ith node in generating addresses for children of the ith node is preferably equal to a floor function of a quotient of a number of addresses reserved out of an address space of the cluster of which the ith node is a part, for children of parent nodes in a layer that includes the ith node, and for decedents of children of parent nodes in the layer that includes the ith node divided by the number of children of parents in the layer that includes the ith node. Assuming, the above mentioned preferred case that the number of children that a particular parent in the cluster is limited to a fixed value Cm, Cskip is given by the following equation:

$$Cskip = \text{floor}\left[\frac{AS - \sum_{k=0}^{Lp}(Cm)^k}{(Cm)^{Lp+1}}\right] \quad \text{EQU. 1}$$

where,

AS is a number of addresses in an address space of the cluster;

k is a layer index;

Lp is the layer that includes the ith node; and

Cm is defined above.

In obtaining the value of Cskip in step 328, the value of Cskip is preferably read from a table stored in memory.

FIG. 5 is a table 500 giving values of Cskip according to a layer number, and a permissible number of children Cm for each node, according to the preferred embodiment of the invention. Column headings of the table specify layer number, and each row, as indicated in the left most column correspond to a particular value of Cm. For some implementations it is sufficient to store a part of the table corresponding to ranges of Cm and layer number that will be used in a network (e.g., 100, 200).

Alternatively, in step 328 the value of Cskip is obtained by executing program steps that embody equation one.

Following step 328, block 330 is a decision block the outcome of which depends on whether the value of Cskip obtained in block 328 is less than one. If so, then in step 332 the limit on the number of children Cm for the ith node is reset to a value of Cskip corresponding to the parent of the ith node minus one, and in step 334 the value of Cskip is set to one, causing addresses of children of the ith node to be spaced by one. Note that an initial value of Cskip obtained in step 328 that is less than one signifies that the children of the ith node will be in the last layer of the cluster. Thereafter the method 300 continues with step 336 described below. If, on the other hand, it is determined in decision block 330 that the value of Cskip is not less than one the method 300 proceeds directly to step 336.

In step 336 a counter of children of the ith node is initialized to zero. In step 338 the ith node listens for requests for responses (of the same type as the ith node transmitted in step 304). Block 340 is a decision block the outcome of which depends on whether a request for responses was received. If not then the process loops back to step 338 and continues to listen for responses. If on the other hand a request for responses was received from another node (hereinafter referred to as the kth node), then the method 300 continues on FIG. 4 with step 402 in which a positive response to the request is transmitted to the kth node. In step 404 a request for a network address (of the same type transmitted by the ith node in step 310) is received from the kth node. In step 406 one is added to the network address received in step 312, i.e., the network address of the ith node, and the result is transmitted to the kth node as a network address for the kth node. In step 408 the ith node address is transmitted to the kth node as the parent address for the kth node. In step 410 the layer number of the ith node which was received in step 316 is incremented by one and sent to the kth node, as the layer number for the kth node.

In step 412 the counter of children of the ith node that was initialized in step 336 is incremented. In step 414 the ith node again listens for requests for responses. Block 416 is another decision block like 324 and 340, the outcome of which depends on whether a request for responses is received. If not the method 300 loops back to block 414 to continue to listen for responses. If, on the other hand, a request for a response is received from another node (hereinafter referred to as the jth node), then the method 300 continues with block 418. Block 418 is a decision block the outcome of which depends on whether the limit on the number of children Cm for the ith node has been reached.

If the limit on the number of children Cm for the ith node has been reached then the process continues with block 420 in which a negative response is sent to the jth node. Thereafter, in step 422 a request for a temporary network address is received from the jth node. Thereafter, in step 424 a temporary address is sent to the jth node. A particular bit pattern (e.g., 254) is preferably reserved for use as a temporary address. The temporary address is an interim address by which the jth node is addressed. Subsequently in step 426 a request for a new cluster address is sent to a central control node (e.g., 102) of the network (e.g., 100) that includes the cluster of which the ith node is a part. The request sent in step 426 is routed through the cluster head of the cluster that includes the ith node. In step 428 a new cluster address is received from the central control node (e.g., 102) via the cluster head of the cluster that includes the ith node and in step 430 the new cluster address is transmitted to the jth node. Thereafter the jth node will begin a new cluster. As a new cluster head the jth node will have its layer number set to zero and its network address preferably set to zero. Optionally prior to assigning a new cluster address to the jth node immediately, the jth node is first instructed by the ith node to seek out another preexisting cluster. However, in as much as the jth node is expected to have listened for positive responses in executing step 306, the ith node can also operate on the assumption that no other clusters are available to the jth node.

If, on the other hand, it is determined in decision block 418 that the limit on the number of children for the ith node has not been reached, then the method 300 continues with step 432 in which a positive response is transmitted to the jth node. thereafter in step 434 a request for a network address is received from the jth node. In step 436 the value of Cskip is added to the last address assigned to a child of the ith node, and the result is transmitted to the jth node as its network address. In step 438, the address of the ith node is transmitted to the jth node as the parent address of the jth node. Thereafter, in step 440 (as in step 410) the layer number of the ith node, which was received in step 316, is incremented by one and sent to the jth node, as the layer number for the jth node. In step 442 the counter of children of the ith node is incremented (the jth node having been accepted as a child of the ith node), and the method loops back to step 414 to listen for further requests for responses from nodes seeking parents.

Although a particular flow chart is presented in FIGS. 3–4, it is to be understand that the organization of programs embodying the teachings of the present invention will vary depending on the programming language used, and programming style.

FIG. 6 is an example of a topology of a cluster 600 developed according to the method shown in FIGS. 3, 4 according to the preferred embodiment of the invention. In the cluster 600 the number of children that a particular node can have Cm is limited to three, and the cluster 600 has four layers. The cluster head 600 has the form of a hierarchical tree topology. A cluster head network node 602 is located at a root position of the hierarchical tree topology. A plurality of additional nodes e.g., 604, 606, 608, 610 of the cluster 600 are coupled directly and indirectly (i.e., via muli-hop paths) to the cluster head 602. Adjacent to several of the nodes in the cluster, the cluster address (which is indicated to be zero for the cluster 600), and the network address of the particular node are listed in parenthesis separated by a comma. The value of Cskip appearing next to each of the several nodes is the value by which addresses of children of the particular node are spaced. Note that a first child of each parent node has an address that is one greater than the address of the parent.

Figure 7:
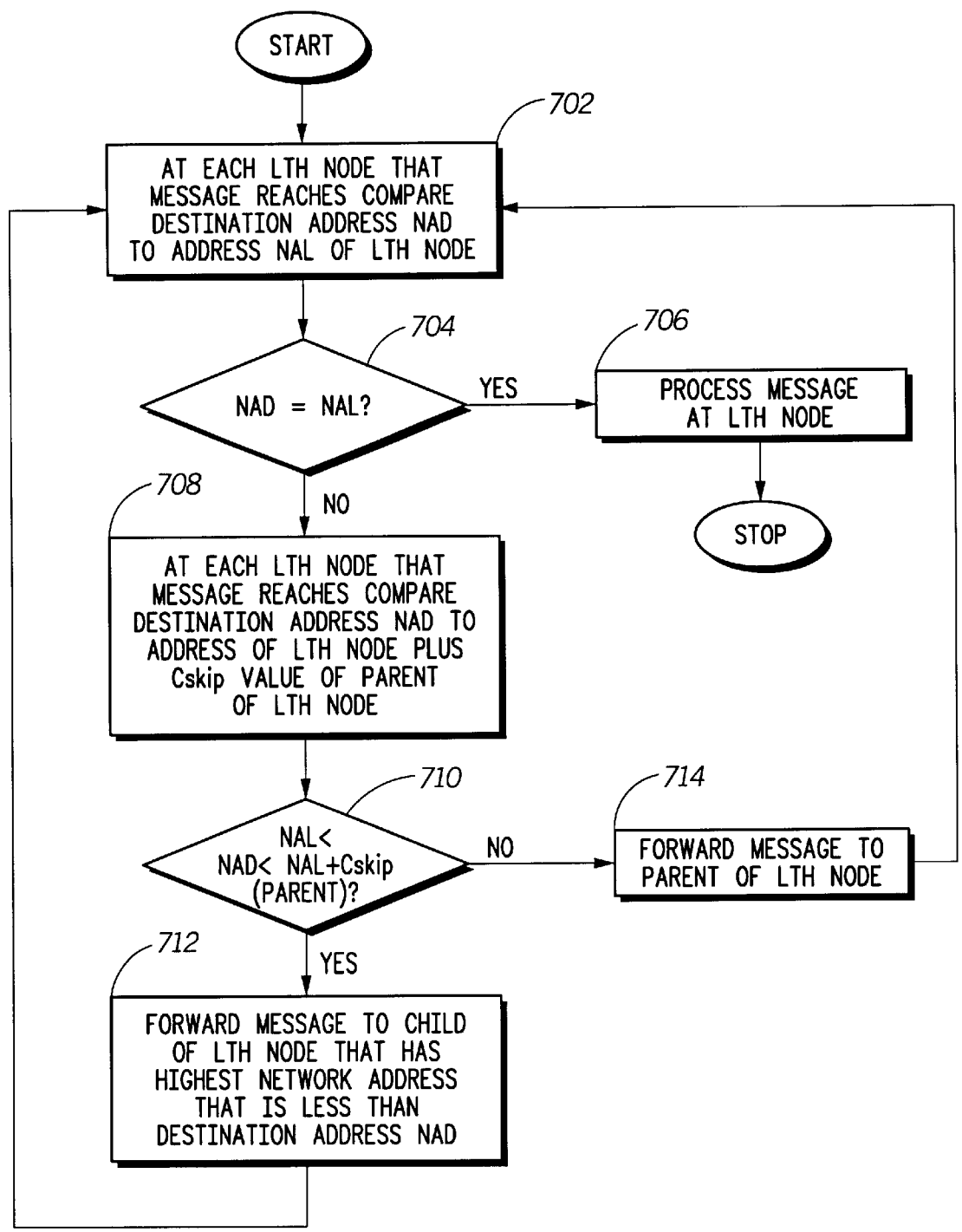
FIG. 7 is a flow chart of a method for routing messages in a cluster such as shown in FIG. 6 having addresses assigned according method shown in FIG. 3 and 4.

FIG. 7 is a flow chart of a method 700 for routing messages in a cluster such as shown in FIG. 6 having addresses assigned according method shown in FIG. 3 and 4. In step 702 at each Lth network node that a message reaches a destination address NAD for the message is compared to the network address NAL of the Lth node. Block 704 is a decision block the outcome of which depends on whether the destination node address NAD is equal to the address NAL of the node that the message has reached. If so then in step 706 the message is processed (e.g., passed to an application running on the Lth node). If not then in step 708 the destination address is compared to a value equal to the network address NAL of the Lth node plus the value of Cskip used by the parent of the Lth node in spacing addresses of the Lth node and any siblings of the Lth node. Block 710 is a decision node the outcome of which depends on whether the destination address NAD is greater than the network address NAL of the Lth node, and less than the value to which destination address NAD is compared in step 708. If so then in step 712 the message is forwarded to a child of the Lth node that has a highest address among the children of the Lth node that is lower than the destination address NAD. Thereafter the method 700 returns to step 702. If on the other hand in block 710 the condition tested in block 710 is not satisfied then in block 714 the message is forwarded to the parent of the Lth node, and thereafter the method 700 returns to step 702.

As demonstrated in FIG. 7, the assignment of addresses according to method 300, the results of which are exemplified in FIG. 6, facilitates an efficient routing scheme.

Figure 8:
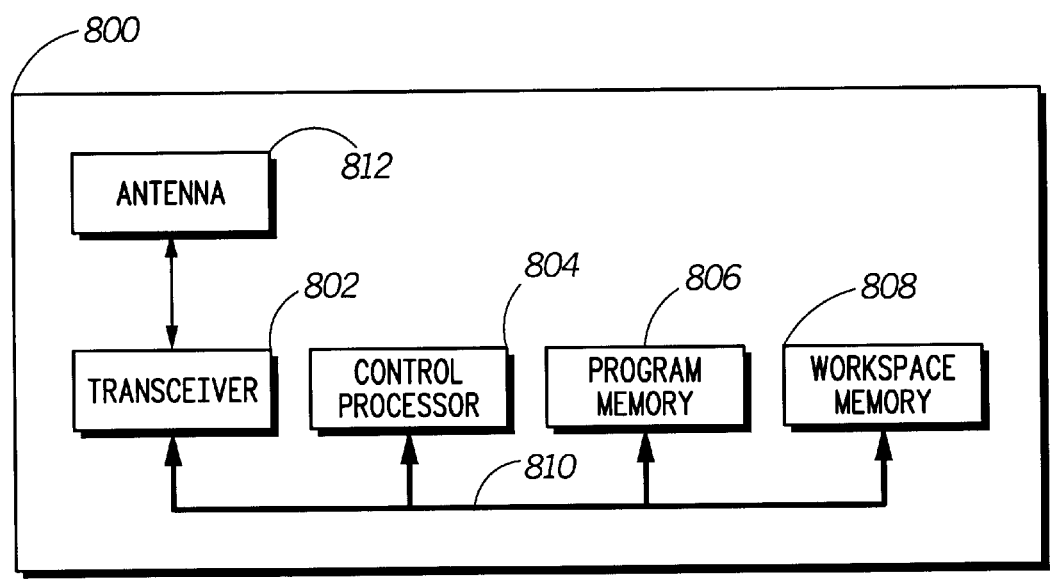
FIG. 8 is a block diagram of a network node according to the preferred embodiment of the invention.

FIG. 8 is a block diagram of a network node 800 according to the preferred embodiment of the invention. The network node comprises a transceiver 802 a control processor 804, a program memory 806 and a work space memory 808 coupled together through a signal bus 810. The control processor 804 controls the overall operation of the node 800, and is used to execute programs embodying the methods shown in FIGS. 3–4, 7. The control processor 804 also serves to generate packets for transmission, and process received packets. The program memory 806 is used to store the programs executed by the control processor 804. The program memory 806 is type of computer readable medium. Programs embodying the method shown in FIGS. 3–4, 7 are alternatively stored in other types of program memories. The works space memory 808 is used as a workspace by the control processor 804 in executing the programs stored in the program memory 802. The transceiver is coupled to an antenna 812.

For the purpose of the present application the floor function is interchange with the trunc function, and therefore as used herein the term floor function means either the floor function or the trunc function.

The computer readable medium used in connection with the present invention as a memory for storing programs can comprise volatile memory such as RAM, or a medium that contains data in a transient state, such as a communication channel, network circuits, or a wireless communication link, or preferably nonvolatile memory including but not limited to, flash memory, Read Only Memory (ROM), EPROM, EEPROM, disk drive. The computer readable medium used as a work space for signal processing operations, can comprise Random Access Memory (RAM).

The present invention, as would be known to one of ordinary skill in the art could be produced in hardware or software, or in a combination of hardware and software. The system, or method, according to the inventive principles as disclosed in connection with the preferred embodiment, may be produced in a single computer system having separate elements or means for performing the individual functions or steps described or claimed or one or more elements or means combining the performance of any of the functions or steps disclosed or claimed.

The invention is not limited to any particular computer program or logic or language, or instruction but may be practiced with any such suitable program, logic or language, or instructions as would be known to one of ordinary skill in the art.

While the preferred and other embodiments of the invention have been illustrated and described, it will be clear that the invention is not so limited. Numerous modifications, changes, variations, substitutions, and equivalents will occur to those of ordinary skill in the art without departing from the spirit and scope of the present invention as defined by the following claims.

What is claimed is:

1. A network comprising:
   a cluster, comprising a plurality of network nodes arranged in a hierarchical tree arrangement, the hierarchical tree arrangement comprising:
      a cluster head network node at a root position of the hierarchical tree arrangement, and a number of layers each including one or more of the plurality of network nodes, wherein each kth layer is identified by a layer number k that indicates a number of hops from network nodes in the kth layer to the cluster head;
   wherein, network nodes in at least each kth layer except for a last layer of the cluster that are children of a particular parent in a k-1th layer are identified by addresses that are assigned by a skipping a number Cskip that is substantially equal to a first number divided by a maximum permissible number of network nodes in the kth layer, wherein the first number is equal to a number of network address allocated for network nodes in the kth layer plus a number of network addresses allocated for network nodes that are decedents of network nodes in the kth layer.

2. The network according to claim 1 wherein:
   each network node is permitted to have a limited number Cm of children and the maximum permissible number of network nodes in each jth layer is equal to Cm raised to the jth power; and
   the first number is equal to a total number of addresses allocated for the cluster minus a sum of over j ranging from 0 to k−1 of Cm raised to the jth power.

3. The network according to claim 1 wherein children in at least each jth layer except for the last layer of the cluster, which are children of a parent node that is identified by a parent address NID are identified by addresses that are selected by counting by a value of Cskip for the jth layer starting with the value of the parent address NID plus one.

4. The network according to claim 1 wherein Cskip is equal to the floor function of the first number divided by the maximum permissible number of network nodes in the kth layer.

5. The network according to claim 1 wherein, in the case that for a last layer of the cluster that a value of the floor function of the first number divided by the maximum permissible number of network nodes in the last layer is less than one:
   for each ith parent of one or more children in the last layer, assigning addresses to a number of children equal to one less than a value of Cskip used to enumerate network nodes in layer that includes the ith parent of the children; and
   assigning addresses to the children nodes in the last layer that are counted by one.

6. A method of assigning addresses to a number N of children of an ith node that is a parent node in a hierarchical tree topology cluster of a network that includes a cluster head node at a root position of the hierarchical tree topology, and a number of nodes arranged in a number Lm of layers, said layers being identified by a layer number index k that is equal to a number of hops from nodes in the kth layer to the cluster head, the method comprising the steps of:
   obtaining a value Cskip by which addresses of the N children are to be spaced that is equal to:
      the floor function value of a quotient of a number of addresses out of an addresses space for the cluster that remain for use by nodes in a layer that includes the number N of children, and for descendents of nodes in the layer that includes the number N of children, divided by a permissible number nodes in the layer that includes the number N of children;
   and
   using the value Cskip to determine N addresses for the number N of children, and
   sending the one or more addresses to the number N of children.

7. The method according to claim 6 wherein the step of obtaining the value of Cskip comprises the step of:
   calculating the value of Cskip.

8. The method according to claim 7 wherein:
   each node in the cluster in at least all layers except for a last layer of the cluster is allowed to have up to a number Cm of children;
   the number of addresses out of an addresses space for the cluster that remain for use by nodes in the layer that includes the number N of children, and for descendents of nodes in the layer that includes the number N of children is calculated by subtracting a sum of over the layer number index k ranging from 0 to a layer number Li associated with the parent node, of Cm raised to the kth power from a total number of address allocated for the cluster; and
   the permissible number of nodes in the layer that includes the one more children is calculated by raising the number Cm of children that each node in the cluster is allowed to have to the power of a layer number Li+1 of the layer that includes the children.

9. The method according to claim 6 wherein the step of obtaining the value of Cskip comprises the step of:
   reading the value of Cskip from a table in a memory.

10. The method according to claim 6 wherein the step of using the value Cskip to determine N addresses for the number N of children comprises the steps of:
    counting out N addresses for the number N of children counting by Cskip starting at an address of the parent node plus one.

11. The method according to claim 6 further comprising the step of:
    prior to sending the addresses to each of the N children receiving requests for addresses from the each of the children.

12. A method of routing messages in a network cluster comprising a plurality of nodes arranged in a hierarchical tree arrangement, that includes a cluster head at a root position, and a plurality of nodes arranged layers wherein each layer is designated by a layer index k that indicates a number of hops from nodes in the kth layer to the cluster head, and wherein children of each particular jth parent node are assigned addresses starting at an address value equal to an address of the jth parent node plus one and counting by a value Cskip for the layer of the children, the method comprising the step of:

at an Lth node at which a message is present, comparing a destination address NAD of the message to the Lth node's address NAL; and in the case that the destination address is the Lth nodes address NAL processing the message at the Lth node; and in the case that the destination address NAD is not equal to Lth nodes address, further comparing the destination address NAD to a second number that is equal to the Lth nodes address plus a value Cskip by which addresses in a layer that includes the Lth node are counted; and in the case that the destination address NAD is greater than the network address NAL of the Lth node, AND is less than the second number, selecting an appropriate child of the Lth node, and forwarding the message to the appropriate child; and in the case that the destination address NAD is at least equal to the second number OR is less than the network address NAL of the Lth node, forwarding the message to the parent node of the Lth node.

13. The method according to claim 12 wherein the step of selecting the appropriate child node comprises the step of:

among a set of children of the Lth node selecting the appropriate node which has the highest network address that is less than the destination address NAD.

14. The method according to claim 12 further comprising the step of:

receiving the message at the Lth processing node.

15. A method of assigning network addresses in a cluster of a network, and establishing new clusters in the network, the method comprising the steps of:

starting at a cluster head node of a first cluster which serves as a first parent node, building a hierarchical cluster tree network of nodes that comprises a plurality of nodes arranged in a plurality of layers wherein each layer is identified by a layer index k that indicates a number of hops from nodes in the kth layer to the cluster head node;

for each kth layer in the first cluster obtaining a value Cskip by which addresses of children of parents in the kth layer are to be spaced, which is equal to a floor function t of first number divided by a maximum permissible number of children of nodes in the kth layer, wherein the first number is equal to a number of addresses remaining to be allocated in the cluster for children of the parents in the kth layer, and descendents of children of parents in the kth layer in the case that Cskip for the kth layer is greater than one, for each ith parent node in the kth layer having an address NID enumerating up to a number Cm of children nodes, starting at address NID+1 and counting by Cskip; and in the case that Cskip for the kth layer is less than one, for each ith parent node in the kth layer having an address NID enumerating a number R of children nodes that is equal to a value of Cskip for the (k−1)th layer minus one, starting at NID+1 and counting by one.

16. The method according to claim 15 further comprising the step of:

after, obtaining a value of Cskip that is less than one for a jth layer, and enumerating children of parents in the jth layer, receiving a request for an address at a node of the first cluster from an additional node; and sending a message to the additional node instructing the additional node to establish a second cluster.

17. The method according to claim 16 further comprising the steps of:

after receiving a request for the address at the node of the first cluster from the additional node, and prior to sending the message to the additional node instructing the additional node to establish a second cluster;

sending a message to a central control node of the network requesting a new cluster address;

receiving a message including a cluster address for the second cluster from the central control node;

forwarding the cluster address for the second cluster to the additional node.

18. The method according to claim 16 wherein the number Cm is constant throughout the first cluster.

\* \* \* \* \*